US007743540B2

(12) United States Patent
McDermott

(10) Patent No.: US 7,743,540 B2
(45) Date of Patent: Jun. 29, 2010

(54) IDENTIFICATION SYSTEM WITH WRISTBAND AND REUSABLE POUCH

(75) Inventor: Steve McDermott, Salt Lake City, UT (US)

(73) Assignee: St. John Companies, Inc., Valencia, CA (US)

(*) Notice: Subject to any disclaimer, the term of this patent is extended or adjusted under 35 U.S.C. 154(b) by 0 days.

(21) Appl. No.: 11/758,960

(22) Filed: Jun. 6, 2007

(65) Prior Publication Data

US 2008/0301990 A1 Dec. 11, 2008

(51) Int. Cl.
*A44C 5/00* (2006.01)
*G09F 1/00* (2006.01)
*G09C 3/00* (2006.01)
*A45F 3/00* (2006.01)
*A45C 13/30* (2006.01)

(52) U.S. Cl. ...................... 40/633; 40/124.06; 283/900; 283/76; 283/77; 224/604

(58) Field of Classification Search .................. 40/633, 40/124.06; 283/900, 76, 77; 224/604
See application file for complete search history.

(56) References Cited

U.S. PATENT DOCUMENTS 2,599,311 A 6/1952 Anderson
3,059,359 A 10/1962 Goldammer et al.
3,197,899 A 8/1965 Twentier et al.
3,279,107 A 10/1966 Baumgartner
3,645,023 A * 2/1972 Larson ........................ 40/633
3,656,247 A 4/1972 Bushnell et al.
3,751,835 A 8/1973 Smith
3,965,589 A 6/1976 McDermott
4,199,882 A 4/1980 Clayman
4,221,063 A 9/1980 Charles et al.
4,226,036 A 10/1980 Krug
4,318,234 A 3/1982 Charles et al.
4,328,978 A 5/1982 McLaughlin
4,616,436 A 10/1986 De Woskin
5,092,067 A 3/1992 Prout
5,364,133 A 11/1994 Hofer et al.
5,388,739 A * 2/1995 Gargan ........................ 224/604
5,423,574 A 6/1995 Fort-Pathroff
5,503,114 A 4/1996 Castagna
5,581,924 A 12/1996 Peterson
5,653,472 A 8/1997 Huddleston et al.
5,758,443 A * 6/1998 Pedrazzini .................. 40/633

(Continued)

OTHER PUBLICATIONS

International Search Report and Written Opinion for corresponding PCT Application No. PCT/US2008/065743, mailed on Oct. 2, 2008.

*Primary Examiner*—Lesley Morris
*Assistant Examiner*—Syed A Islam
(74) *Attorney, Agent, or Firm*—Christie, Parker & Hale, LLP

(57) ABSTRACT

The present invention relates to identification systems and more particularly to patient identification systems comprising an identification band and a reusable pouch. The identification system comprises an identification band that is passed through one or more slits in a reusable identification pouch. The pouch includes an information area where information about the patient may be printed, and a pocket where alert labels or other tags may be stored. When the identification band is removed, the pouch may be mounted onto a new band. The information contained on and attached to the pouch may be reused each time a new identification band is needed.

22 Claims, 3 Drawing Sheets

U.S. PATENT DOCUMENTS

| | | | |
|---|---|---|---|
| 6,000,160 | A | 12/1999 | Riley |
| 6,016,618 | A | 1/2000 | Attia et al. |
| 6,212,808 | B1 | 4/2001 | Rubel |
| 6,510,634 | B1 | 1/2003 | Riley |
| 6,641,048 | B1 | 11/2003 | Schintz et al. |
| 6,748,687 | B2 | 6/2004 | Riley |
| 6,766,932 | B2 * | 7/2004 | Hansen et al. .............. 224/604 |
| 6,782,648 | B1 * | 8/2004 | Mosher, Jr. .................. 40/633 |
| 6,976,327 | B2 | 12/2005 | Goodin et al. |
| 7,000,951 | B2 | 2/2006 | Valenti, Jr. |
| 7,017,294 | B2 | 3/2006 | Riley |
| 7,047,682 | B2 | 5/2006 | Riley |
| 7,137,216 | B2 | 11/2006 | Ali et al. |
| 2004/0113421 | A1 | 6/2004 | Penuela et al. |
| 2004/0164544 | A1 | 8/2004 | Thall et al. |
| 2005/0108912 | A1 | 5/2005 | Bekker |
| 2005/0274048 | A1 * | 12/2005 | Gerrie ..................... 40/124.06 |
| 2005/0279001 | A1 | 12/2005 | Riley |
| 2006/0059753 | A1 * | 3/2006 | Riley et al. ................... 40/633 |
| 2006/0143961 | A1 | 7/2006 | Riley |
| 2006/0174527 | A1 | 8/2006 | Henley |
| 2006/0218837 | A1 | 10/2006 | Riley |
| 2006/0230661 | A1 | 10/2006 | Bekker |
| 2006/0242875 | A1 | 11/2006 | Wilson et al. |
| 2007/0028495 | A1 | 2/2007 | Kotik et al. |
| 2008/0098635 | A1 * | 5/2008 | Jain et al. ..................... 40/633 |
| 2008/0110069 | A1 * | 5/2008 | McDermott et al. ........... 40/633 |

* cited by examiner

IDENTIFICATION SYSTEM WITH WRISTBAND AND REUSABLE POUCH

FIELD

The present invention relates to identification systems and more particularly to patient identification systems comprising an identification band and a reusable pouch.

BACKGROUND

Identification systems are used in many fields to provide a convenient and effective way to identify important information about a person, animal, or object. Identification systems often consist of a wristband or bracelet that is attached to a person around the wrist or ankle and that states information about the wearer. For example, these wristbands may be used to identify a patient in a hospital and to provide important information about the patient, such as the doctor's name, the patient's blood type, the patient's allergies, and other useful information. Wristbands may also be used to identify people admitted to a sporting event, concert, amusement park, or other similar establishments and events. Similar identification systems may be useful in many other situations where certain information about particular individuals, animals, or objects needs to be readily available.

Identification bands such as wristbands and bracelets are often made of a flexible material that is wrapped about the wearer's wrist and then secured with a fastener. The fastener may be an adhesive or mechanical closure, and it may be an integral part of the wristband or a separate element that is attached to the wristband. The fasteners are typically permanent, not reusable, so that the wearer is not able to easily unfasten the wristband and remove it. In order to remove the wristband, it may be necessary to cut the wristband. The wristband is not reusable, but must be discarded after one use.

The wristband may be pre-printed with information about the wearer, or it may have a space or area where information can be written by hand, printed, or attached by a label. For example, in the medical field, an adhesive label may be printed with patient information and then attached to the wristband. As long as the wristband remains attached to the patient, attending nurses, doctors, and other caregivers can easily locate this information before administering any treatment to the patient.

However, in the medical field, wristbands often need to be removed and replaced. A wristband may need to be removed in order to draw blood or insert an IV line, to bathe or wash the patient, to take blood pressure or measure a pulse, or to administer other types of care. Each time the wristband is removed and discarded, all of the information included on the wristband is lost. A new wristband may need to be attached to the patient along with all of the patient's medical information. This process leaves room for error, as a patient may be left unidentified, or may be identified with a new wristband that has incorrect or incomplete identifying information. In some cases, several different tags, labels, or wristbands may need to be replaced each time a wristband is removed and a new wristband attached, such as blood tags or wristbands, allergy indicators, and the patient's identification. Reattaching these tags, labels, or wristbands or printing new tags, labels, or wristbands each time a wristband is removed takes up valuable time and creates the potential for serious error.

Thus, there is still a need for an identification system that allows for a wristband to be removed and replaced without discarding all of this information. There is also a need for a wristband that consolidates many tags, labels, and wristbands so that they may be well organized, readily recognizable, and reusable.

SUMMARY

The present invention relates to identification systems for identifying a person, animal, or object, and more particularly to an identification system comprising a wristband having a reusable pouch. In one embodiment, an identification system to identify information about a person comprises a band having a first end and a second end; a pouch comprising a pocket and a slit, wherein the band is configured to pass through the slit; and a fastener configured to close the band into a loop by fastening the band to itself proximate the first end of the band and the second end of the band. The pouch further comprises an information area for receiving information about the person.

In one embodiment, an identification system for identifying a person comprises a band having a plurality of openings; a pouch comprising a pocket, a first slit near a first end of the pouch, a second slit near a second end of the pouch opposite the first end, and an information area for holding information about the person; and a fastener passing through overlapping openings in the band to close the band into a loop. The pouch is releasably secured to the band by passing the band through the first and second slits.

In one embodiment, a sheet for preparing an identification system for a person comprises a pouch comprising a first panel having a top edge and a bottom edge; a second panel connected to the bottom edge of the first panel; and a flap connected to the top edge of the first panel, wherein at least one of the first and second panels has an information area for receiving information about the person; and a plurality of companion labels for receiving information about the person.

In one embodiment, an identification pouch for identifying a person comprises a top panel having an information area; a bottom panel having a first slit and a second slit; and a flap configured to connect the bottom panel to the top panel to form a pocket between the top panel and the bottom panel. The first and second slits are configured to receive a band to slidably mount the pouch on the band.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of the presently preferred embodiments of an identification system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present invention relates to identification systems for providing information about a person, animal, or object. In one embodiment, the identification system includes an identification band or bracelet that is attached to the wearer's arm, leg, or other appendage, usually at the wrist or ankle. Before the identification band is secured to the wearer, it is passed through one or more slits in an identification pouch. This pouch includes a top panel where important information about the wearer may be printed, written, or attached, and it includes a pocket where alert labels, tags, or other information can be stored. The identification band is fed through the slit or slits in the pouch and then secured around the wearer's wrist or ankle. The pouch is thus securely attached to the identification band while the band remains around the wrist, ankle, or other appendage. When the identification band is removed from the wearer, the pouch can be removed from the identification band by sliding the band back through the slits in the pouch. The identification band is discarded, but the pouch may be reused. A new identification band may be fed through the slit or slits in the pouch and secured again to the wearer. Thus, the information contained on and attached to the pouch may be reused each time a new identification band is needed. Additional tags and warnings may be connected to the pouch so that they can also be easily transferred to a new band.

The identification system is described below in relation to use in a hospital or other medical center, but the invention is not limited to this context, and may be used in other establishments as well. In addition, the identification system is described below in relation to use on a person, by attachment to a person's wrist, but the invention is not limited to use on a person or use on a wrist and may be used to identify other objects.

Figure 1:
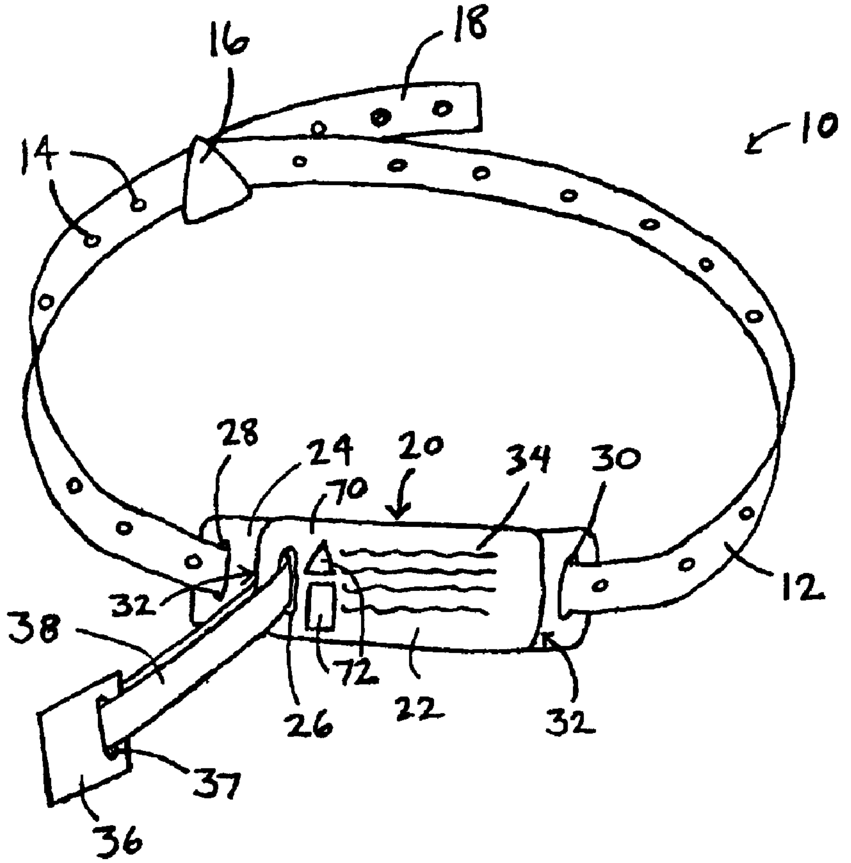
FIG. 1 is a front perspective view of an identification system provided according to an embodiment of the invention.

Referring to FIG. 1, a band identification system 10 includes an identification band or strap 12 and an identification band pouch 20. In the embodiment shown, the pouch 20 has a first slit 28 and a second slit 30. The identification band 12 is inserted through these slits and then wrapped around a person's wrist, ankle, or appendage. The identification band 12 has apertures 14 through which a fastener or clip 16 is inserted to fasten the identification band into a loop or circle. If the patient's wrist is smaller than the length of the identification band, the excess length 18 of the identification band 12 may be cut away and discarded. Once the identification band 12 has been closed around the patient's wrist or ankle, the pouch 20 is securely attached to the patient. Doctors, nurses, and other attendants can use the identifying information 34 on the pouch 20 to quickly obtain important information about the patient. When the identification band needs to be removed and replaced, the identification band 12 may simply be cut at any convenient location around its circumference and removed from the patient. The pouch 20 can then be slid off the identification band 12. The cut identification band 12 is discarded, and a new band is inserted through the slits 28 and 30 in the pouch 20 and attached to the patient. The pouch 20 can thus be reused when the identification band 12 is discarded.

The identification band 12 may be any suitable identification band known in the art. In the embodiment shown in FIG. 1, the identification band 12 has apertures 14 which are aligned for inserting a fastener, such as the fastener 16. However, in other embodiments, the identification band 12 may have an adhesive closure which is used to close the identification band into a loop around a wrist or ankle. Such a band may not have any apertures 14. In other embodiments, the identification band 12 may include an integral fastener which is folded over onto itself to clasp the identification band together. This type of band does not require a separate fastener 16. These types of identification bands are well known in the art.

In one embodiment, the identification band 12 is a flexible, processable material. The material may be processable to allow information to be handwritten, labeled, or electronically printed onto the identification band. For example, the hospital name and/or the admitting department of the hospital may be printed directly on the identification band. Materials for the identification band 12 include polyester, Tyvek® (manufactured by the DuPont Company), vinyl, cloth, and other suitable materials. The identification band should be flexible so that it folds easily into a loop or circle and feels comfortable to the wearer. A tear-resistant material is preferred so that the identification band is not easily torn apart and removed, by the wearer or anyone else, either intentionally or inadvertently. Tear-resistant material is difficult to break by tearing, but simple to remove by cutting. A nurse or doctor or other attendant may easily cut the identification band free with scissors or any other suitable cutting utensil.

Any of the identification bands just described may include apertures 14, such as the ones shown in FIG. 1. When the identification band is encircled around a wrist, ankle, or other appendage, the apertures on one end of the identification band are brought into alignment with the apertures on the other end. The presence of multiple apertures 14 on either end of the identification band allows the band to be adjusted to many desired lengths, to comfortably fit around wrists or ankles of various sizes. The multiple apertures 14 allow the identification band to be custom fit to each individual wearer. A fastener such as the fastener 16 is then inserted through the overlapping apertures 14 to secure the identification band into a loop around the wrist or ankle.

The fastener 16 may be a separate fastener, as shown in FIG. 1, or it may be integrally connected to the identification band 12. The fastener 16 may be a triangular alert clip as described in U.S. patent application Ser. No. 11/558,401, the entire contents of which are expressly incorporated herein by reference. The triangular alert clip can provide a dual function; it secures the identification band into a loop and provides additional information about the wearer. For example, the alert clip may be color-coded to indicate the patient's service code, that the patient has a particular allergy or blood type, or that the patient has signed a "do not resuscitate" order or has other significant medical conditions. If more than one alert is needed for a particular patient, additional alert clips may be attached through the open apertures 14. These alert clips may be coded by color or shape, or may have warnings or symbols imprinted, embossed, written, or adhesively attached to the alert area 17, shown in FIG. 2. The alert area 17 is positioned on the top surface of the alert clip to be readily visible to the attending caregiver. The color of the alert clip is also readily visible and may indicate a particular warning.

These alert clips may be used even when they are not necessary for actually closing the identification band into a loop, such as when the identification band 12 has an adhesive fastener or closure. With an adhesive closure, the identification band 12 can be adhesively secured around the wrist without the use of an external fastener or clip. However, such a band may still include apertures 14 so that alert clips such as the ones described above may be attached to the identification band to provide easily visible alerts and warnings.

Alternatively, the apertures 14 may be missing from the identification band 12 when an adhesive fastener is used. When an adhesive closure is used, the identification band 12 may include an adhesive section along one end of the identification band. This section may be protected by a release liner until the identification band is ready to be used. The release liner is then removed and discarded, exposing the adhesive layer on the end of the identification band. The identification band is then encircled around the wrist or ankle and adjusted to the appropriate size. The adhesive is then pressed against the encircled portion of the identification band to secure the identification band into a loop. If the identification band is longer than necessary, the excess length 18 may be cut away and discarded.

Referring again to FIG. 1, the pouch 20 includes a first slit 28 and a second slit 30. These slits have a size that is sufficient to allow the identification band 12 to pass through. One end of the identification band is fed through one of the slits, passed behind the pouch 20, and then fed through the other slit. The identification information 34 on the front side of the pouch is still visible, with the identification band 12 passing behind the pouch on the opposite side, as shown in FIG. 2.

Figure 2:
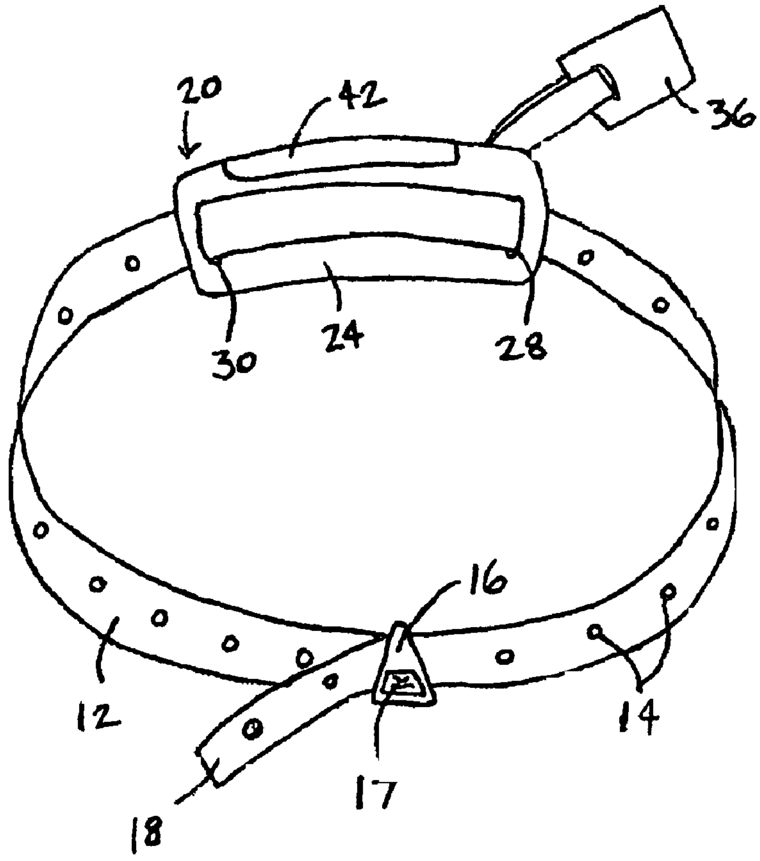
FIG. 2 is a rear perspective view of the identification system of FIG. 1.

In the embodiment shown in FIGS. 1-2, the pouch 20 is one piece of material that is folded over to form a pocket 32 between two sides of the pouch. The pouch has a top panel 22, a bottom panel 24, and a flap 42. The flap is connected to one edge of the top panel 22, and the bottom panel 24 is connected to the opposite edge of the top panel 22. The pouch is folded along fold lines 44 and 46 (shown in FIG. 4) to form the pouch shape. The flap 42 is then adhesively secured to the back side of the bottom panel 24, as shown in FIG. 2. This construction forms a pocket 32 between the top panel 22 and the bottom panel 24. The pocket 32 may be constructed in other ways, by positioning the flap differently or without requiring the use of a flap 42. For example, the pocket 32 could use a fastener, or be sealed together.

The wearer's identification information 34 is printed or otherwise attached or disposed on the top panel 22. In the embodiment shown in FIG. 1, the information 34 is printed directly onto the top panel 22 by handwriting, labeling, or electronically printing. In other embodiments, the information could be written directly onto the top panel 22, or an adhesive label with information printed onto the label could be applied to the top panel 22. Any combination of these methods of applying information to the pouch can be used. When the identification band is secured to the wearer, this information 34 is clearly visible on the top panel 22. In this embodiment, a tag, such as tag 36, is partially hidden from view when it is inserted into the pocket 32, because the top panel 22 blocks at least part of the tag from view.

The identification information 34 is optional, and the identification system described above may be used without including this information 34 on the top panel 22. In one embodiment, the top panel 22 is made of a clear material without any information 34 printed directly on the panel. The clear top panel 22 allows a tag, such as tag 36, to be visible through the top panel 22 when the tag is inserted into the pocket 32.

In one embodiment, the top panel 22 also includes a space 70 for attaching alerts or warnings 72. The alerts may be adhesive stickers or labels, written or stamped messages, tags, clasps, or any other suitable warning. For example, the alert 72 may be a colored sticker with an adhesive backing that is attached to the top panel 22 at the space 70 to warn attendants that the patient has a particular allergy. As another example, the alert 72 could be a clasp similar to the clasp 16, and the top panel 22 may have holes or apertures in the area 70 for attachment of the alert clasp 72. Many types of alerts and warnings are possible for attachment or placement in the space 70. The alerts 72 may be coded by color, symbol, words, and/or shape, to indicate information to the attendants. When the identification band needs to be removed, it may be cut and discarded, and the pouch 20 with the alerts 72 may be reused on a new band without losing the information contained in the alerts 72.

Although two slits 28 and 30 are shown in FIG. 1, the pouch 20 could operate with a single slit through which the identification band passes. When one slit is used on one side of the pouch 20, the other side of the pouch may hang free. This allows the bottom panel 24 to be visible, as well as the top panel 22. In this embodiment, both the top panel 22 and the bottom panel 24 may have information printed, written, or adhesively applied. However, when two slits 28 and 30 are used, the pouch 20 is held flat against the identification band 12 such that it does not hang free or dangle. This embodiment may be preferred where the information 34 printed on the top panel 22 is a barcode or other machine-readable information that is easiest to scan when the information is held flat. The two slit embodiment also prevents the pouch from hanging away from the identification band and getting caught, twisted, or torn away.

Figure 3:
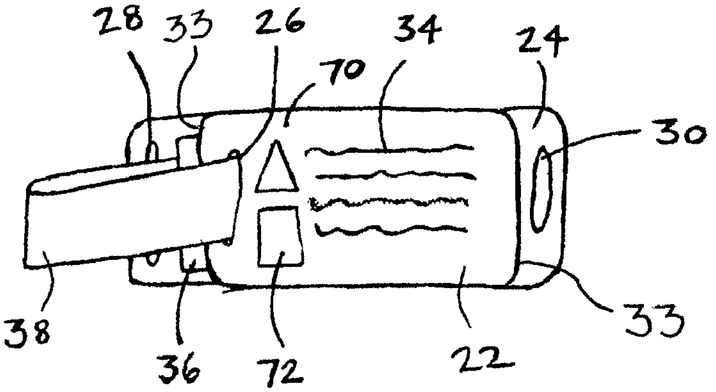
FIG. 3 is a front view of an identification band pouch provided according to an embodiment of the invention.

As shown in FIG. 1, the top panel 22 may also include a side slit 26. The side slit 26 may be used to attach additional tags or alerts to the pouch 20. In FIG. 1, a supplemental information tag or indicator 36 is attached to the side slit 26 with a flexible tether 38. The supplemental tag 36 has its own slit 37 for use with the tether 38. The tether 38 can be passed through the side slit 26 and the tag slit 37 and then closed into a loop with an adhesive or other suitable closure. The supplemental tag 36 may provide additional information about the patient, such as blood bank identification codes that indicate that blood was drawn from the patient. The supplemental tag 36 can be slid into the pocket 32 of the pouch 20 through one of the openings 33 at each end of the pocket 32 when not in use, as shown in FIG. 3. The tether 38 should have a sufficient length to allow the tag 36 to be slid into the pocket 32. The tag 36 can be slid out of the pocket and inspected when necessary, and it can remain contained within the pocket when it is not needed. The pocket thus provides an efficient storage area for extra tags and alerts that do not need to be visible at all times. Instead of hanging from the identification band or pouch and possibly becoming snagged or torn, these tags can be safely stored in the pocket 32.

Although only one tag 36 is shown in FIG. 1, multiple supplemental tags may be attached to the pouch. The pouch may also include additional slits, in addition to the side slit 26, for the attachment of extra tags and tethers.

The pouch 20 should have a large enough size that the information 34 is visible and easy to read and the pocket 32 is large enough to store one or more tags 36, but the pouch should not be so large that it causes discomfort to the patient or obstructs access by medical professionals and attendants. In the embodiment shown, the pouch is approximately 3.5 inches by 1.25 inches in size.

The pouch 20 may be made out of a flexible, processable polyester, vinyl, Tyvek, cloth, or other suitable materials. The material may be handwritten, labeled, or electronically printed with the information 34. Information may be printed on both the top panel 22 and bottom panel 24, or only on the top panel 22. The pouch should be flexible so that it is comfortable to wear, but also should be sturdy enough that the information 34 is clearly visible and possibly machine-readable, such as a barcode.

Figure 4:
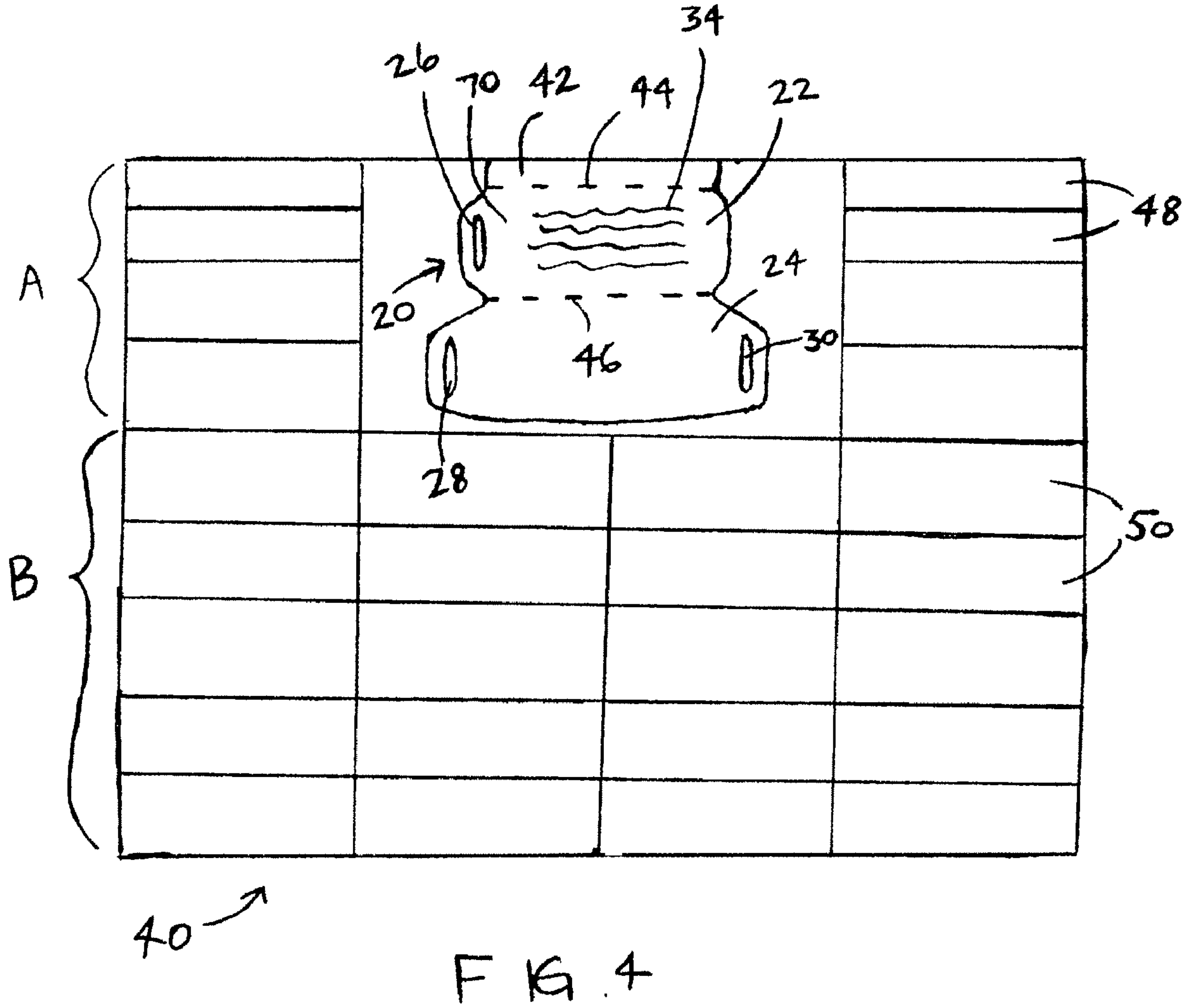
FIG. 4 is a top view of an identification sheet that may be used to construct an identification system according to an embodiment of the invention.

The pouch 20 may be provided in the form of an identification sheet 40, shown in FIG. 4. The sheet 40 is divided into two areas A and B. At the top of the sheet, area A includes the unassembled pouch 20, with flap 42, top panel 22, and bottom panel 24. Area A also includes four newborn or pediatric labels 48 which are smaller in size than the other labels on the sheet, and four companion or chart labels 50. The lower area B includes twenty companion or chart labels 50 that may be printed with identifying information that may match the information printed onto the pouch 20. Area A may be made of the flexible polyester, vinyl, cloth, or other suitable materials described above while area B may be made of a standard adhesive-backed paper for the labels 50. Alternatively, both areas A and B may be made of the flexible material.

The identification sheet 40 is preferably a standard size that can pass through standard printers. In the embodiment shown, the sheet 40 is 8.5 by 11 inches in size. Information can be printed onto the sheet 40 at the desired locations, such as on each companion label 50 and on the top panel 22 of the pouch 20. The newborn/pediatric labels 48 may also be printed with information. In the embodiment shown, the companion labels are 1 by 2.5 inches in size. In other embodiments, the size and number of labels may be varied.

Figure 5:
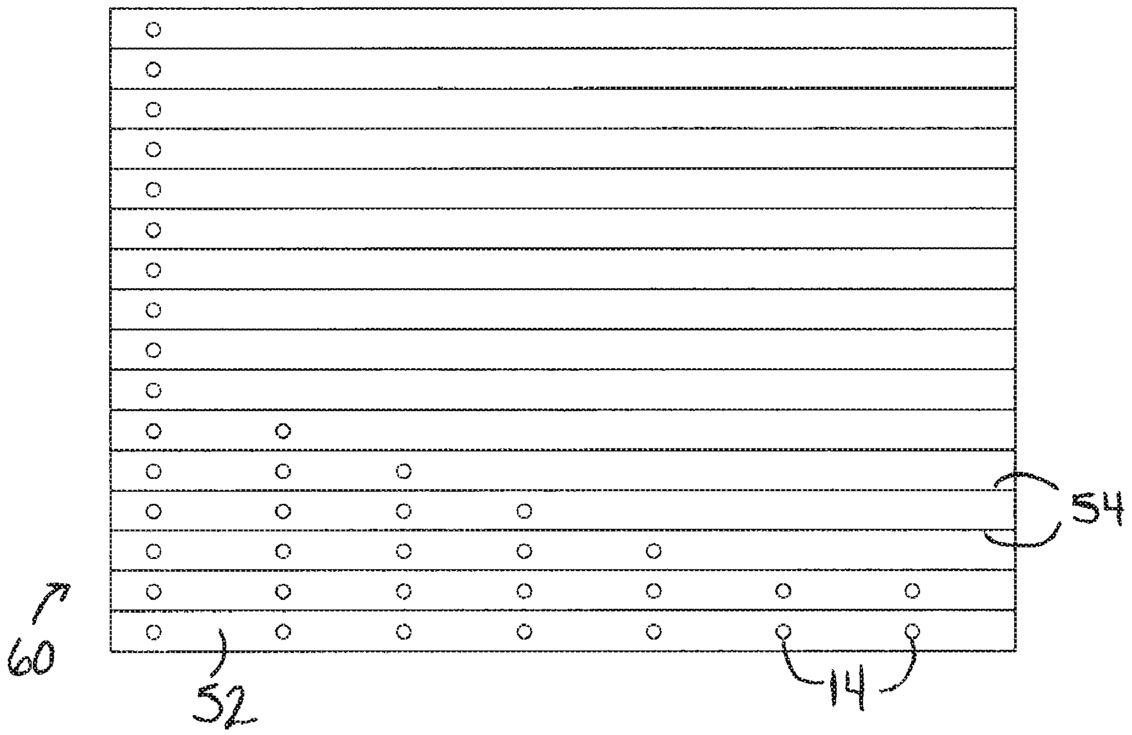
FIG. 5 is a top view of an identification band sheet with original and/or replacement identification bands according to an embodiment of the invention.

Two other sheets may be used in conjunction with the sheet 40, the identification band 12, and the pouch 20. FIG. 5 shows an identification band sheet 60 including multiple band replacements 52. The identification band replacements 52 are shown with apertures 14. In other embodiments the number and placement of these apertures 14 may vary, or the apertures 14 may be missing, as discussed above. The identification band replacements 52 are separated from each other by lines of weakness 54 so that each band replacement 52 can be easily torn away from the sheet when needed. The identification band replacements 52 may be the same as the original identification band 12, which may be taken from the identification band sheet 60. In one embodiment, the identification band replacements 52 are different from the original identification band 12. For example, in one embodiment, the identification band replacements 52 are color-coded to indicate that the original band has been removed. The identification band sheet 60 has a color that is different from the color of the original identification band 12. When the identification band 12 is cut away from the patient and removed, a band replacement 52 with a different color than the identification band 12 is then secured to the patient. Doctors, nurses, and other attendants can then observe that the identification band has been removed at least once, so the patient's identification information can be double-checked for accuracy. The identification bands 52 may also be color coded with alerts, such as "do not resuscitate" orders, allergy warnings, or other types of information. They may also have space to write patient alerts or information. The identification band replacements 52 may be made of the same material as the original identification band 12.

Figure 6:
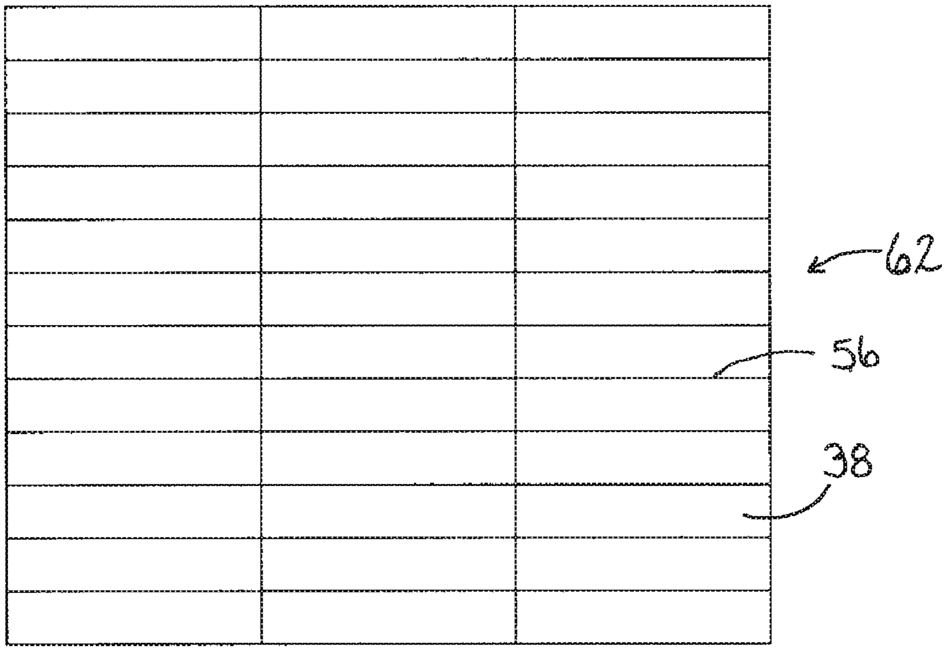
FIG. 6 is a top view of a tether sheet with replacement tethers according to an embodiment of the invention.

In addition, a tether sheet 62 may also be used in accordance with the identification system of the present invention. The tether sheet 62, shown in FIG. 6, comprises multiple separate tethers 38. In the embodiment shown, the tethers 38 are all approximately the same size, although in other embodiments the width, length, and number of tethers 38 may vary. These tethers 38 are divided by lines of weakness 56 which allow the individual tethers 38 to be separated from the sheet 62. When a supplemental information tag 36 (shown in FIG. 1 and discussed above) is needed, a tether 38 can be separated from the sheet, passed through the slits 37 and 26, and closed into a loop. The tether thus secures the tag 36 to the pouch 20. The tether 38 is preferably made of the same flexible, tear-resistant material that is used for the identification band and/or pouch. The tether sheet 62 is preferably the same size as the boxes in which the tags 36 are stored, so that the tether sheets 62 can be stored in the same box with the tags 36. In the embodiment shown, the tether sheet 62 is 9 and ¾ inches by 7 inches in size.

The identification band, pouch, and sheets described above form an efficient and effective identification system. When the system is implemented at a hospital or other medical facility, the hospital obtains a stack of blank identification sheets 40. When a patient checks in or is admitted, his or her identification and other important information is obtained and entered into a computer. An identification sheet 40 is then passed through a printer, and the patient's information is printed onto the companion labels 50, the newborn/pediatric labels 48 (if needed), the top panel 22 of the pouch 20, and, optionally, the bottom panel 24 of the pouch 20. The pouch 20 is then separated from the sheet 40 and folded along the fold lines 44 and 46. The flap 42 is adhesively secured to the bottom panel 24 to form the pocket shape. A identification band 12 is then fed through the slits 28 and 30 in the pouch 20 such that the pouch 20 is secured to the identification band 12. The identification band 12 may then be attached to the patient by wrapping it around the patient's ankle or wrist and securing the identification band with either an adhesive closure, an integral snap closure, a separate clip or fastener 16, or other suitable fasteners.

At this point the patient has been properly identified, and his or her identity and important medical information 34 is printed on the pouch 20 and secured to the patient's wrist or ankle. The pouch 20 can slide along the identification band 12 to be positioned for optimal viewing of the information 34. The companion labels 50 may be used to identify other items that are associated with the patient, such as medication, medical charts, X-rays, etc. Additional alerts 72 may be attached to the pouch if necessary.

The supplemental tag 36 may be added to the identification band 12 at a later time, such as when blood is drawn from the patient. The attendant drawing the blood can carry preprinted blood tags and a tether sheet 62 to the patient's bedside. The blood tag 36 can be attached to the pouch 20 with the tether 38, as described above. The tube with the withdrawn blood can be marked with one of the companion labels 50 to identify it as belonging to this particular patient. When the blood tag is not in use, it can be slid into the pocket 32 behind the top panel 22 of the pouch 20. The next time blood is drawn, the tag 36 can be slid out of the pocket 32 for inspection. If the tag 36 needs to be removed or replaced, the tether 38 can simply be cut and a new one separated from the tether sheet 62. A new tag 36 can then be attached to the pouch 20 with a new tether 38. The tethers 38 can be a bright color so that even when the tag 36 is placed in the pocket 32, the tether 38 alerts nurses, doctors, and attendants that blood work has been done and a tag 36 is attached.

If the identification band 12 needs to be removed or replaced for any reason, it can be cut away from the patient's wrist or ankle. The pouch 20, with any associated tags 36 and alerts 72, can be slid away from the identification band 12 before the identification band is discarded. The pouch 20 retains the information 34 printed or adhered to the top panel 22, and it retains any additional tags 36 attached through the side slit 26. The pouch, with all of this information, can then be slid onto a replacement band 52 which is separated from the identification band sheet 60. The identification band sheet 60 with the replacement identification bands 52 may be kept at the nurse's station or in the patient's room for quick and easy replacement of the identification band 12. As discussed above, the replacement bands may have a color that differs from the color of the original identification band 12 to indicate to attendants that the original identification band 12 has been replaced.

If the original identification band 12 has any alert clips or alert fasteners 16, new alert clips can be attached to the identification band replacement 52. The replacement band 52 thus has all the same information as the original identification band 12, without requiring any new labels or tags or bands to be printed or marked. The same pouch 20 and tags 36 and alerts 72 are simply transferred from the first identification band 12 to the new band 52. This system removes a source of error in patient identification, by using the same pouch 20 for multiple identification bands, instead of printing new labels, pouches, tags, or bands every time an identification band is discarded and replaced.

Although limited embodiments of the identification system have been specifically described and illustrated herein, many modifications and variations will be apparent to those skilled in the art. For example, the pouch may have a different size or shape than that described, or may attach to the identification band in a different fashion, such as by buttons or clasps or other suitable fasteners. Accordingly, it is to be understood that the identification system constructed according to principles of this invention may be embodied other than as specifically described herein. The invention is also defined in the following claims.

What is claimed is:

1. An identification system to identify information about a patient in a hospital or other patient facility, the identification system comprising:

a band having a first end and a second end, the band being configured to close into a loop by bringing the first end and the second end together; and a pouch comprising a pocket and a slit, the pocket comprising an opening at an end of the pocket, wherein the band is configured to pass through the slit and behind the pocket; and wherein the pouch further comprises information on a top surface of the pocket providing information about the patient, and wherein the pouch further comprises a supplemental slit adapted to engage one or more supplemental indicators.

2. The identification system of claim 1, wherein the band further comprises a plurality of apertures and a fastener configured to pass through at least one aperture to close the band into a loop.

3. The identification system of claim 1, wherein the band further comprises an adhesive fastener.

4. The identification system of claim 1, further comprising a supplemental indicator connected to the supplemental slit.

5. The identification system of claim 4, wherein the pocket has a size sufficient to receive the supplemental indicator through the opening of the pocket.

6. The identification system of claim 1, wherein the pouch further comprises a second slit and wherein the band is configured to pass through the second slit.

7. The identification system of claim 1, wherein the pouch is made from a tear-resistant polyester material.

8. The identification system of claim 1, further comprising a fastener comprising an alert area for displaying additional information about the patient.

9. An identification system for identifying a person, comprising:

a band having a plurality of openings;

a pouch comprising a pocket having an opening at an end of the pocket, a first slit near a first end of the pouch, a second slit near a second end of the pouch opposite the first end, and an information area holding information about the person on a top surface of the pocket; and a fastener passing through overlapping openings in the band to close the band into a loop, wherein the pouch is releasably secured to the band by passing the band through the first and second slits and behind the pocket, and wherein the pocket is positioned between the band and the information on the top surface, with the band passing through both slits and behind the pocket.

10. The identification system of claim 9, wherein the information area comprises a first space for receiving the information and a second space for receiving alerts or warnings about the person.

11. The identification system of claim 9, wherein the fastener comprises a top segment having information about the person.

12. An identification system for identifying a person, comprising:

a band having a plurality of openings;

a pouch comprising a pocket, a first slit near a first end of the pouch, a second slit near a second end of the pouch opposite the first end, and an information area for holding information about the person; and a fastener passing through overlapping openings in the band to close the band into a loop, wherein the pouch is releasably secured to the band by passing the band through the first and second slits, wherein the pouch further comprises a supplemental slit for attachment to a supplemental indicator.

13. The identification system of claim 12, further comprising a sheet of replacement tethers for attaching the supplemental indicator to the pouch with a tether.

14. The identification system of claim 9, further comprising a sheet of replacement bands.

15. A wearable identification pouch for identifying a patient in a hospital or other patient facility, the identification pouch comprising:

a top panel having information about such patient on a top surface of the top panel;

a bottom panel having a first slit and a second slit; and a flap configured to connect the bottom panel to the top panel to form a pocket between the top panel and the bottom panel, the pocket having an opening at an end of the pocket;

wherein the first and second slits are configured to receive a band to slidably mount the pouch on the band.

16. The identification pouch of claim 15, wherein the top panel further comprises a tether slit for connecting a supplemental indicator.

17. The identification pouch of claim 16, further comprising a supplemental indicator connected to the tether slit with a tether.

18. The identification system of claim 1, wherein the pouch is free to slide along the band.

19. The identification system of claim 9, wherein the pouch is free to slide along the band.

20. An identification system to identify information about a patient in a hospital or other patient facility, the identification system comprising:

a band having a first end and a second end, the band being configured to close into a loop by bringing the first end and the second end together; and a pouch comprising a pocket and a first slit and a second slit, the pocket comprising an opening at an end of the pocket, wherein the band is configured to pass through the first and second slits and behind the pocket; and wherein the pouch further comprises information on a top surface of the pocket providing information about the patient, and wherein the pocket is positioned between the band and the information on the top surface, with the band passing through both slits and behind the pocket.

21. An identification system to identify information about a patient in a hospital or other patient facility, the identification system comprising:

a band having a first end and a second end, the band being configured to close into a loop by bringing the first end and the second end together; and a pouch comprising a pocket and a slit, the pocket comprising an opening at an end of the pocket, wherein the band is configured to pass through the slit and behind the pocket; and wherein the pouch further comprises information on a top surface of the pocket providing information about the patient, and wherein the pocket comprises a second opening at a second end of the pocket.

22. An identification system to identify information about a patient in a hospital or other patient facility, the identification system comprising:

a band having a first end and a second end, the band being configured to close into a loop by bringing the first end and the second end together; and a pouch comprising a pocket and a slit, the pocket comprising an opening at an end of the pocket, wherein the band is configured to pass through the slit and behind the pocket, and wherein the pouch further comprises information on a top surface of the pocket providing information about the patient, and wherein the pouch further comprises information on a bottom surface of the pouch to provide information about the patient.

* * * * *